United States Patent
Funakoshi

(10) Patent No.: US 6,480,346 B2
(45) Date of Patent: Nov. 12, 2002

(54) LENS HOLDER

(75) Inventor: Hideaki Funakoshi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/845,435

(22) Filed: Apr. 30, 2001

(65) Prior Publication Data

US 2001/0040740 A1 Nov. 15, 2001

(30) Foreign Application Priority Data

May 9, 2000 (JP) ........................................ 2000-003033

(51) Int. Cl.$^7$ ................................................. G02B 7/02
(52) U.S. Cl. ........................................ 359/808; 359/819
(58) Field of Search ................................ 359/819, 809, 359/810, 811, 808; 3/820; 396/529

(56) References Cited

U.S. PATENT DOCUMENTS

| | | | |
|---|---|---|---|
| 4,929,056 A | * 5/1990 | Lieb et al. | 359/896 |
| 5,050,963 A | * 9/1991 | Murakami | 359/963 |
| 5,781,351 A | * 7/1998 | Murakami | 359/808 |
| 5,982,565 A | * 11/1999 | Nomura et al. | 359/819 |
| 5,991,101 A | * 11/1999 | Holdere et al. | 359/819 |
| 6,008,957 A | * 12/1999 | Nomura et al. | 359/819 |
| 6,172,822 B1 | * 1/2001 | Belliveau et al. | 359/819 |
| 6,219,191 B1 | * 4/2001 | Iwaki et al. | 359/811 |

FOREIGN PATENT DOCUMENTS

| | | |
|---|---|---|
| JP | 6-48572 | 12/1994 |
| JP | 7-201060 | 8/1995 |
| JP | 8-329508 | 12/1996 |
| JP | 9-35312 | 2/1997 |
| JP | 9-320088 | 12/1997 |

OTHER PUBLICATIONS

Patent Abstracts of Japan, Publication No. 08–329508, published Dec. 13, 1996.

Patent Abstracts of Japan, Publication No. 09–035312, published Feb. 7, 1997.

Patent Abstracts of Japan, Publication No. 07–201060, published Aug. 4, 1995.

Patent Abstracts of Japan, Publication No. 09–320088, published Dec. 12, 1997.

* cited by examiner

*Primary Examiner*—Georgia Epps
*Assistant Examiner*—Saeed Seyrafi
(74) *Attorney, Agent, or Firm*—Rosenthal & Osha L.L.P.

(57) ABSTRACT

In an lens holder, a lens 10 inserted in an insertion hole 2 is bonded and secured to a lens holder 1 by an adhesive agent poured in slots 4 formed in such a manner as to divide an outer wall portion 3. Since a sufficient amount of adhesive agent can be allowed to adhere to the lens, the lens can be fixed to the lens holder with sufficient strength. In addition, since the adhesive agent 20 poured in the slots 4 overflows also to the outer side of the slots of the lens holder 1, it is possible to reduce the amount of adhesive agent 20 flowing into the insertion hole 2 side, and it is possible to prevent the adhesive agent from adhering to the surface of the lens 20.

3 Claims, 3 Drawing Sheets

LENS HOLDER

BACKGROUND OF THE INVENTION

1. Field of the Invention

The present invention relates to a lens holder for holding an objective lens used in an optical pickup head in an optical disk apparatus such as a compact disk (CD) player or a laser disk (LD) player.

2. Description of the Related Art

Conventionally, optical disk apparatuses such as compact disk (CD) players and laser disk (LD) players have been put to practical use. As is well known, an optical disk apparatus is so arranged that a laser beam (hereafter simply referred to as the beam) emitted from a laser diode is focused by an objective lens (hereafter simply referred to as the lens) and is radiated to an optical disk, and the reflected light from the disk is detected by a sensor (PIN photodiode), to as to read information recorded on the surface of the optical disk irradiated by the beam.

Incidentally, with respect to the optical disk which is rotated at a high speed, the lens is moved at a high speed to apply the beam emitted from the laser diode to a proper position (reading position) on the optical disk, and the gravitational acceleration which is momentarily very large can be applied to the lens. Accordingly, unless the lens is firmly secured to the lens holder, problems occur in which the position where the lens is fixed to the lens holder becomes offset or the lens becomes disengaged from the lens holder.

In addition, a lens using an acrylic synthetic resin as a raw material tends to be used for the purpose of reducing the cost of the apparatus itself. With this type of lens, since the mechanical strength of the raw material is weaker than a lens using glass as a raw material, an adhesive agent is used for fixing the lens to the lens holder. In addition, various techniques have been proposed to fix the lens to the lens holder with sufficient strength (such as JP-B-8-329508 and JP-A-9-35312).

With the conventionally proposed techniques, a recessed portion capable of retaining an adhesive agent is formed in an outer wall surrounding a side surface of the lens inserted in a lens insertion hole formed in the lens holder. Since the adhesive agent is thus poured into the recessed portion formed in the outer wall portion, the adhesive agent poured into the recessed portion adheres in a large amount to the side surface of the lens inserted in the insertion hole, thereby improving the strength of adhesive bonding of the lens to the lens holder.

However, there has been a problem in that when the lens is bonded and secured to the lens holder, the adhesive agent poured in the recessed portion overflows from the recessed portion, and the overflowing adhesive agent flows to the insertion hole side of the lens holder and adheres to the surface of the lens inserted in the insertion hole. It should be noted that, if the adhesive agent adheres to the lens surface, the aberrations of the lens deteriorate, and it becomes impossible to focus the beam emitted from the laser diode to a sufficient size. Accordingly, the accuracy for reading the information recorded on the optical disk declines.

For this reason, a huge outer ring (a peripheral annular wall on the outer side of the effective diameter of the lens) is conventionally provided on an outer periphery of the lens so ensure the adhesive agent overflowing from the recessed portion does not adhere to the huge outer ring and does not adhere to the lens surface. Incidentally, in this case, since the outside diameter of the lens becomes large, there is a problem in that the lens holder becomes large in size.

In addition, although proposals are made in JP-B-8-329508 and JP-A-9-35312 to newly provide a recessed portion for receiving the adhesive agent overflowing from the recessed portion to the insertion hole side, a sufficient effect is not thereby obtained.

SUMMARY OF THE INVENTION

The present invention has been made in view of the above, and therefore an object of this invention is to provide a lens holder which makes it possible to obtain sufficient strength in the attachment of the lens by using an adhesive agent and which makes it possible to prevent the adhesive agent from adhering to the lens surface, by adopting a shape allowing the overflowing adhesive agent to flow to the outer side of the lens holder in view of the fact that the cause of the aforementioned problems lies in the fact that the overflowing adhesive agent flows to the insertion hole side.

To achieve the above object, the lens holder in accordance with the invention has the following features:

(1) A lens holder for fixing a lens thereto by using an adhesive agent, wherein an insertion hole for insertion of the lens, a lens receiving portion for receiving the lens inserted in the insertion hole, and an outer wall portion for surrounding a side surface of the lens inserted in the insertion hole and received by the lens receiving portion are formed, and a plurality of slots into which the adhesive agent is poured and which are adapted to fix the lens inserted in the insertion hole are formed in the outer wall portion, the slots being formed in a shape for dividing the outer wall portion.

(2) The slots have a shape in which bottom surfaces thereof are located upwardly of the lens receiving portion.

(3) The bottom surfaces of the slots are inclined surfaces which are inclined toward an outer side of the lens holder.

(4) The bottom surfaces of the slots are chevron-shaped surfaces in which inclined surfaces which are inclined to an inner side and an outer side of the lens holder are made to abut against each other.

In this construction, the lens inserted in the insertion hole is bonded and secured by the adhesive agent poured in the slots at portions corresponding to the slots formed in the outer wall portion. Accordingly, since a sufficient amount of adhesive agent can be allowed to adhere to the lens, the lens can be fixed to the lens holder with sufficient strength. In addition, since the outer sides of the slots are open, the adhesive agent overflowing from the slots overflows not only to the inner side of the slots, i.e., to the insertion hole side, but also to the outer side of the slots. Accordingly, it is possible to reduce the amount of adhesive agent flowing into the insertion hole side, and it is possible to effectively prevent the adhesive agent from adhering to the lens surface.

In addition, since the bottom surfaces of the slots are located upwardly of the lens receiving portion, the adhesive agent flowing into the insertion hole side from the slots enters the gap between the outer peripheral surface of the lens inserted in the insertion hole and the inner peripheral surface of the lens holder. Accordingly, it is possible to bond and secure the lens to the lens holder more firmly.

In addition, if the bottom surfaces of the slots are formed as inclined surfaces which are inclined to the outer side, it is possible to further reduce the amount of adhesive agent flowing into the insertion hole side, and it is possible to substantially reliably prevent the adhesive agent from adhering to the lens surface.

In addition, if the bottom surfaces of the slots are formed in chevron shapes, it is possible to allow an appropriate amount of adhesive agent to flow into the insertion hole side as well. Hence, the adhesive agent can be allowed to enter the gap between the outer peripheral surface of the lens inserted in the insertion hole and the inner peripheral surface of the lens holder, so that it is possible to bond and secure the lens to the lens holder even more firmly.

DETAILED DESCRIPTION OF THE PREFERRED EMBODIMENTS

Figure 1:
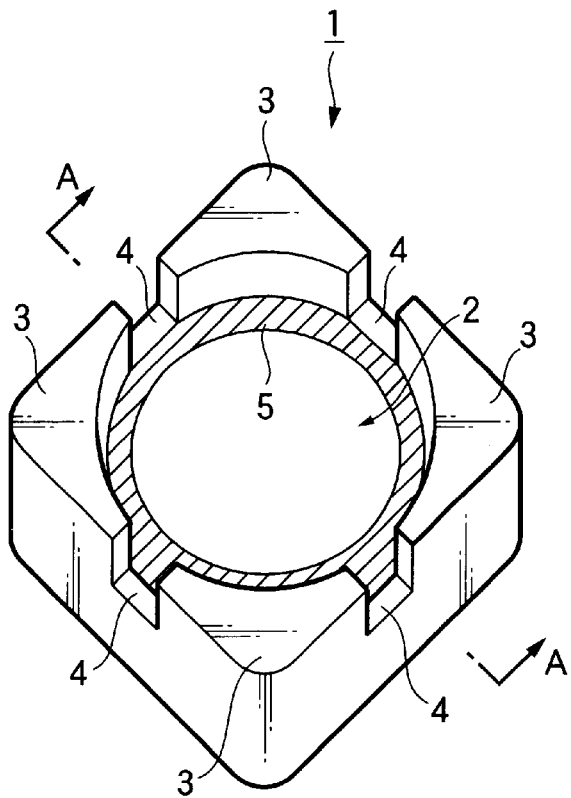
FIG. 1 is a diagram illustrating the external appearance of a lens holder in accordance with an embodiment of the invention.
Figure 2:
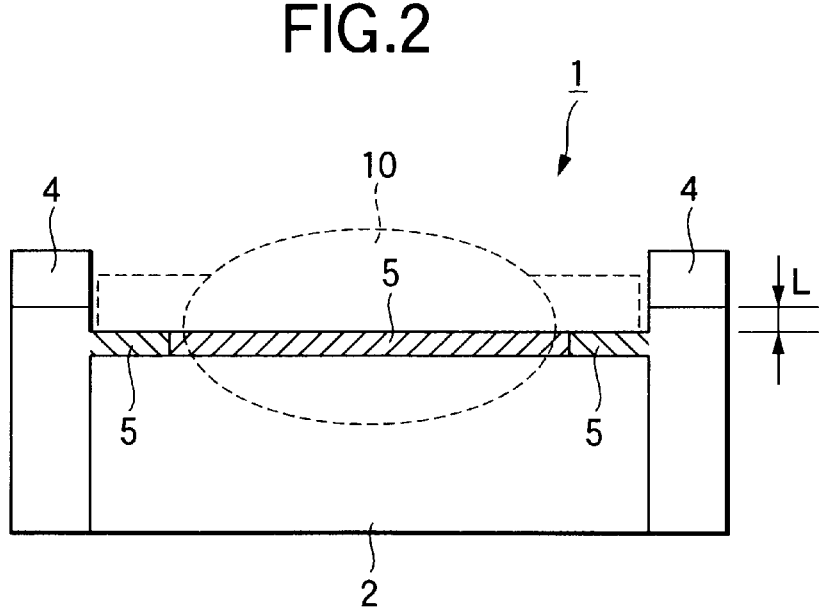
FIG. 2 is a cross-sectional view taken along line A—A in FIG. 1.
Figure 3:
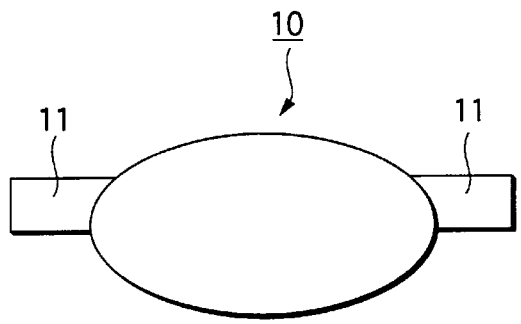
FIG. 3 is a diagram illustrating the external appearance of the lens.

Hereafter, a description will be given of a lens holder in accordance with the embodiments of the invention. FIG. 1 is a diagram illustrating the external appearance of the lens holder in accordance with an embodiment of the invention, and FIG. 2 is a cross-sectional view taken along line A—A in FIG. 1. Further, FIG. 3 is a cross-sectional view of the lens which is attached to the lens holder in accordance with the embodiment. In a lens holder 1 in this embodiment, an insertion hole 2 for inserting a lens 10 is formed in its central portion, as shown in the drawings. The insertion hole 2 is formed through the lens holder 1. In an outer wall 3 which is formed around an outer periphery of the insertion hole 2 in such a manner as to surround the insertion hole 2, a plurality of (four in the drawings) slots 4 which divide the outer wall 3 are formed. In addition, a receiving portion 5 for receiving the lens 10 inserted in the insertion hole 2 is formed around an inner periphery of the insertion hole 2. As shown in FIG. 2, bottom surfaces of the slots 4 are positioned upwardly of the upper surface of the receiving portion 5 by L.

In addition, the lens 10 uses an acrylic synthetic resin as a raw material, and an outer ring 11 is formed integrally on its outer peripheral portion, as shown in FIG. 3. It should be noted that this outer ring 11 is sufficiently smaller than a conventional one. Furthermore, the thickness of the outer ring 11 is larger than the aforementioned level difference L.

Figure 4:
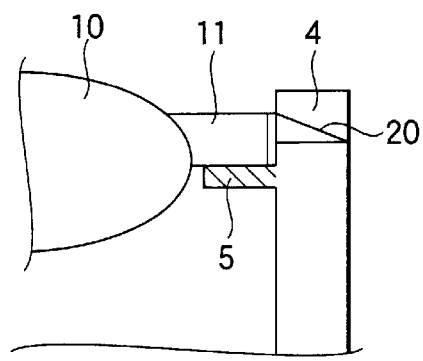
FIG. 4 is an enlarged view of a slot in the lens holder in accordance with the embodiment of the invention.

Next, a description will be given of a method of attaching the lens 10 to the lens holder 1 in accordance with this embodiment. An operator inserts the lens 10 into the insertion hole 2 of the lens holder 1. As for the lens 10 inserted in the insertion hole 2, the outer ring 11 of the lens 10 is placed on the receiving portion 5 formed around the inner periphery of the insertion hole 2, as shown in FIG. 2. Since the thickness of the outer ring 11 is larger than the level difference L between the bottom surfaces of the slots 4 and the upper surface of the receiving portion 5, portions of the side surface of the outer ring 11 oppose open surfaces of the slots 4. In this state, the operator pours an adhesive agent 20 into the respective slots 4 formed in the lens holder 1. As shown in FIG. 4, the adhesive agent 20 poured in the slots 4 adheres substantially uniformly to the side surfaces (portions opposing the open surfaces of the slots 4) of the outer ring 11 of the lens 10, and also adheres uniformly to the bottom surfaces and side surfaces of the slots 4. Accordingly, the bond area between the lens 10 inserted in the insertion hole 2 and the lens holder 1 is large, so that the lens 10 can be bonded and secured to the lens holder 1 with sufficient strength.

In addition, since a portion of the adhesive agent 20 poured in the slots 4 also flows into the gap between the inner peripheral surface of the insertion hole 2 and the outer ring 11, the strength of adhesive bonding of the lens 10 to the lens holder 1 improves. Moreover, since the slots 4 are also open on the outer peripheral side of the lens holder 1, when the adhesive agent 20 poured in the slots 4 has overflowed from the slots 4, not all the overflowing adhesive agent 20 flows into the gap between the inner peripheral surface of the insertion hole 2 and the outer ring 11, but the overflowing adhesive agent 20 also flows to the outer side of the lens holder 1. Accordingly, the amount of the adhesive agent 20 flowing into the gap between the inner peripheral surface of the insertion hole 2 and the outer ring 11 is reduced, so that a situation does not occur in which the overflowing adhesive agent 20 adheres to the inside of the effective diameter of the lens 10 in the conventional manner.

Further, since it suffices if the operator only pours the adhesive agent 20 into the slots 4 formed in the outer wall 3 of the lens holder 1, it is possible to easily confirm the pouring points of the adhesive agent 20 in the lens holder 1, so that the operation can be performed efficiently. In addition, also in a confirmation operation (an operation of confirming whether the lens 10 has been properly bonded and secured to the lens holder 1) which is performed after completion of the aforementioned operation, it is possible to easily confirm such as the negligence in pouring the adhesive agent 10 into the slots, so that the efficiency of the operation is improved.

It should be noted that although it has been described above that the adhesive agent 20 is poured into the slots 4 after the insertion of the lens 10 into the insertion hole 2, it goes without saying that a similar advantage can be obtained even if the lens 10 is inserted in the insertion hole 2 after the adhesive agent 20 is poured into the slots 4.

Figure 5:
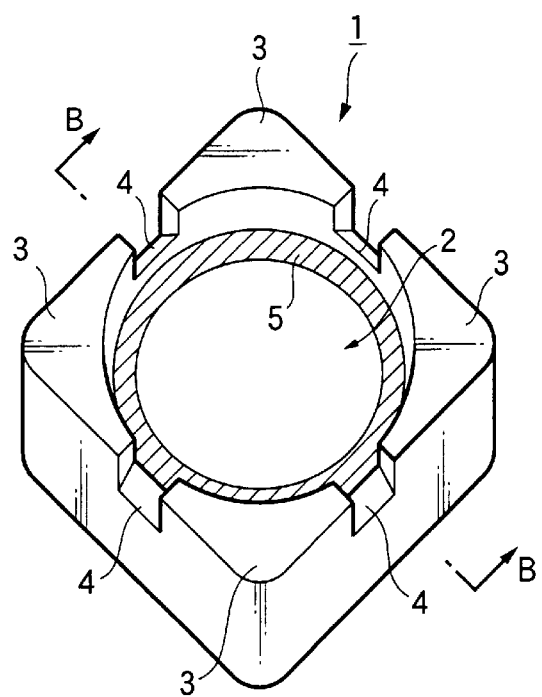
FIG. 5 is a diagram illustrating the external appearance of a lens holder in accordance with another embodiment of the invention.
Figure 6:
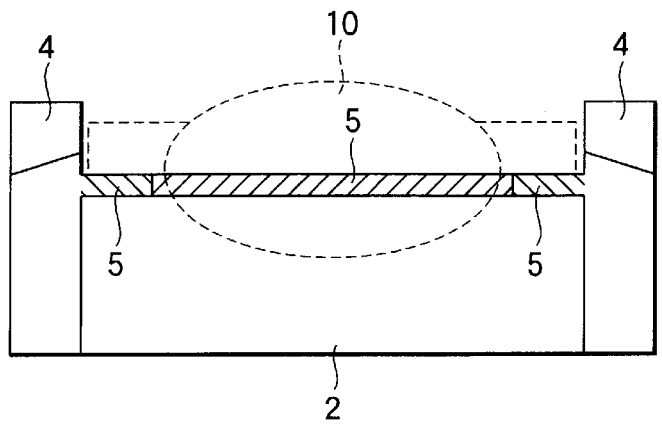
FIG. 6 is a cross-sectional view taken along line B—B in FIG. 5.

Next, a description will be given of a lens holder in accordance with another embodiment of the invention. FIG. 5 is a diagram illustrating the external appearance of the lens holder in accordance with this embodiment, and FIG. 6 is a cross-sectional view taken along line B—B in FIG. 5. The difference with the lens holder 1 in the foregoing embodiment lies in that the bottom surfaces of the slots 4 are formed as inclined surfaces which are inclined toward the outer side of the lens holder 1. The other arrangements are the same.

With this lens holder 1 in accordance with this embodiment, since the bottom surfaces of the slots 4 are formed as inclined surfaces which are inclined toward the outer side, when the adhesive agent 20 poured in the slots 4 has overflowed from the slots 4, much of the adhesive agent 20 flows outside the lens holder 1 along the inclined surfaces of the slots 4, it is possible to further reduce the amount of the adhesive agent 20 flowing into the insertion hole 2 side. Accordingly, it is possible to more reliably prevent the adhesive agent 20 overflowing from the slots 4 from adhering to the inner side of the effective diameter of the lens 10.

Figure 7:
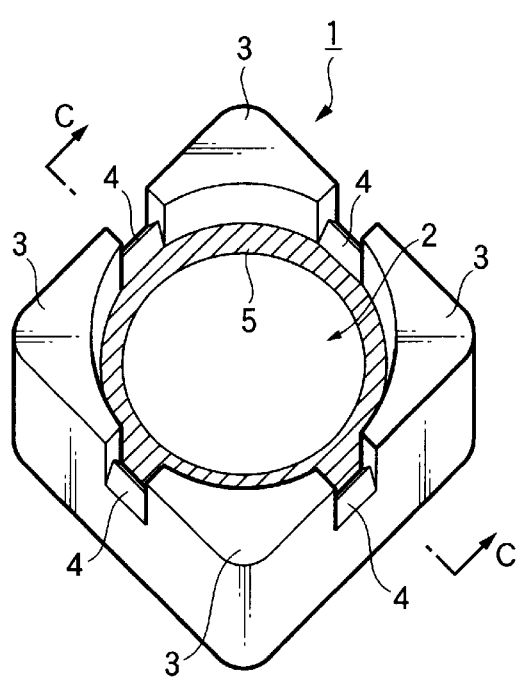
FIG. 7 is a diagram illustrating the external appearance of a lens holder in accordance with still another embodiment of the invention.
Figure 8:
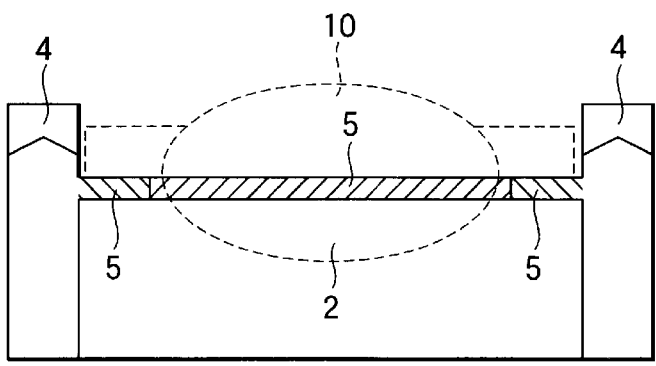
FIG. 8 is a cross-sectional view taken along line C—C in FIG. 7.

Furthermore, a description will be given of a lens holder in accordance with still another embodiment of the invention. FIG. 7 is a diagram illustrating the external appearance of the lens holder in accordance with this embodiment, and FIG. 8 is a cross-sectional view taken along line C—C in FIG. 7. The difference with the lens holders 1 in the foregoing embodiments lie in that the bottom surfaces of the slots 4 are formed as chevron-shaped surfaces combining inclines surfaces which are inclined toward the outer side and the inner side of the lens holder 1. The other arrangements are the same.

With this lens holder 1 in accordance with this embodiment, since the bottom surfaces of the slots 4 are formed in chevron shapes in which the bottom surfaces of the slots 4 are inclined toward the outer side and the inner side, when the adhesive agent 20 poured in the slots 4 has overflowed from the slots 4, the amounts of the adhesive agent 20 flowing to the inner side and the outer side of the lens holder 1 become substantially the same. Accordingly, it is possible to reduce the amount of the adhesive agent 20 flowing into the insertion hole 2 side. At the same time, it is possible to allow a sufficient amount of the adhesive agent 20 to flow into the gap between the inner peripheral surface of the insertion hole 2 and the outer ring 11, so that it is possible to bond the lens 10 to the lens holder 1 with sufficient strength.

As described above, in accordance with the invention, since the shape is formed such that the adhesive agent used at the time of bonding and fixing the lens to the lens holder flows out to the outer side of the lens holder, the lens can be fixed with sufficient strength, and the adhesive agent can be prevented from adhering to the lens.

What is claimed is:

1. A lens holder for fixing a lens thereto by using an adhesive agent, comprising:

an insertion hole portion into which said lens is inserted;

a lens receiving portion for receiving said lens inserted in said insertion hole, and an outer wall portion for surrounding a side surface of said lens inserted in said insertion hole and received by said lens receiving portion; and a plurality of slots into which the adhesive agent is poured and which are configured to fix said lens inserted in said insertion hole, wherein said plurality of slots are formed in said outer wall portion so as to completely perforate the outer wall portion, and wherein each of said plurality of slots has a bottom surface located above said lens receiving portion.

2. The lens holder according to claim 1, wherein said bottom surfaces of said slots are inclined surfaces which are inclined toward an outer side of said lens holder.

3. The lens holder according to claim 1, wherein said bottom surfaces of said slots are chevron-shaped surfaces in which inclined surfaces which are inclined to an inner side and an outer side of said lens holder are made to abut against each other.

* * * * *